(12) United States Patent
Saito et al.

(10) Patent No.: US 8,833,535 B2
(45) Date of Patent: Sep. 16, 2014

(54) CONSTANT-FORCE DEVICE AND MICROMETER

(71) Applicant: Mitutoyo Corporation, Kawasaki (JP)

(72) Inventors: Osamu Saito, Kawasaki (JP); Yoshiaki Shiraishi, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 154 days.

(21) Appl. No.: 13/626,650

(22) Filed: Sep. 25, 2012

(65) Prior Publication Data

US 2013/0075215 A1 Mar. 28, 2013

(30) Foreign Application Priority Data

Sep. 28, 2011 (JP) ................. 2011-212617

(51) Int. Cl.
*G01B 3/18* (2006.01)
*F16D 43/202* (2006.01)
*G01B 3/00* (2006.01)

(52) U.S. Cl.
CPC . *G01B 3/18* (2013.01); *G01B 3/008* (2013.01)
USPC .... 192/56.61; 33/815; 192/69.81; 192/114 R; 464/39

(58) Field of Classification Search
USPC .......... 192/56.61, 69.81; 464/38, 39; 33/815, 33/831
See application file for complete search history.

(56) References Cited

U.S. PATENT DOCUMENTS

| 2,075,754 | A | * | 3/1937 | Williams | ........................ 33/815 |
| 4,062,203 | A | * | 12/1977 | Leonard et al. | ................. 464/38 |
| 4,553,330 | A | * | 11/1985 | Yamauchi et al. | .............. 33/815 |
| 4,655,103 | A | * | 4/1987 | Schreiber et al. | .......... 192/56.61 |
| 4,947,714 | A | * | 8/1990 | Fluri | ............................... 81/475 |
| 6,176,162 | B1 | * | 1/2001 | Ludwig et al. | .................. 81/473 |

FOREIGN PATENT DOCUMENTS

| EP | 1 099 928 A1 | 5/2001 |
| EP | 2 149 772 A1 | 2/2010 |
| JP | A-2001-141402 | 5/2001 |

OTHER PUBLICATIONS

Nov. 27, 2012 Extended European Search Report issued in European Patent Application No. 12186315.3.

\* cited by examiner

*Primary Examiner* — Rodney H Bonck
(74) *Attorney, Agent, or Firm* — Oliff PLC

(57) ABSTRACT

A constant-force device includes a first ratchet wheel mounted rotatably on a shaft and having first sawtoothed projections, a second ratchet wheel mounted on the shaft so as not to rotate relative to the shaft but to move along the shaft and having second sawtoothed projections opposed to the first sawtoothed projections, an intermediate ratchet wheel mounted on the shaft so as not only to rotate relative to the shaft but also to move along the shaft between the first ratchet wheel and the second ratchet wheel and having a pair of intermediate sawtoothed projections meshing with the first and second sawtoothed projections respectively, a biasing member configured to bias the second ratchet wheel towards the first ratchet wheel, and a lock mechanism configured to set the first and intermediate ratchet wheels in a connected or unconnected state.

5 Claims, 6 Drawing Sheets

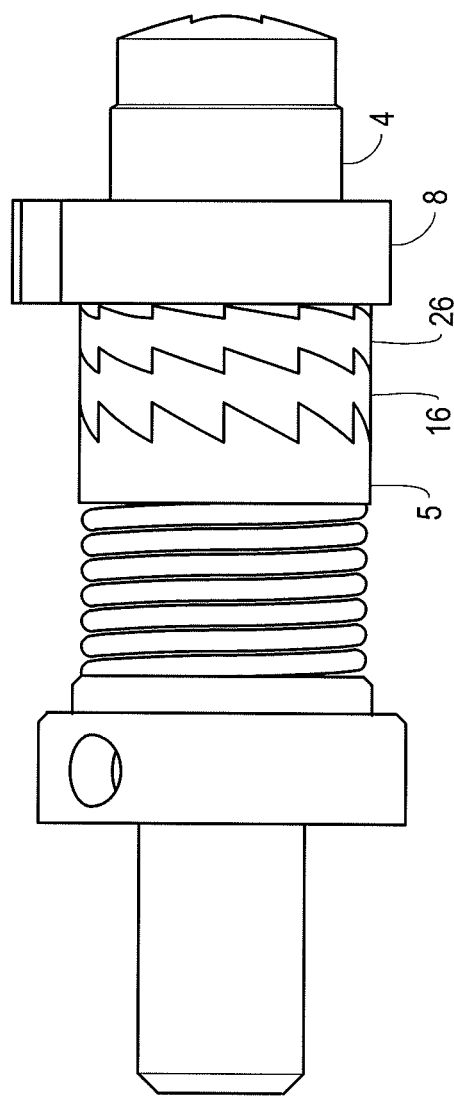

CONSTANT-FORCE DEVICE AND MICROMETER

CROSS-REFERENCE TO RELATED APPLICATION(S)

The present application claims the benefit of priority of Japanese Patent Application No. 2011-212617, filed on Sep. 28, 2011. The disclosures of this application are incorporated herein by reference.

BACKGROUND

1. Technical Field

The present invention relates to a constant-force device and a micrometer.

2. Related Art

In micrometers in which a spindle is displaced in an axial direction by rotating an operation sleeve to measure a dimension of an object to be measured based on the displaced position of the spindle, there is known a micrometer which includes a constant-force device which maintains a measuring force that is applied to an object to be measured from a spindle at a constant level (for example, refer to Patent Literature 1).

The constant-force device described in Patent Literature 1 is a unit that is disposed in an interior of an operation sleeve and which is adapted to cause the operation sleeve to turn idly relative to the spindle when the spindle is brought into abutment with the object to be measured whereby a load of a predetermined magnitude or larger is applied to the operation sleeve. Then, the constant-force device includes a shaft, a first ratchet wheel, a second ratchet wheel, and a compression spring.

The shaft extends along an axial direction of the spindle and is connected to the spindle at one end thereof, supporting rotatably the operation sleeve.

The first ratchet wheel is fixed to an inner circumferential surface of the operation sleeve and rotates relative to the shaft in response to the rotation of the operation sleeve. Additionally, a plurality of teeth are formed on the first ratchet wheel that project in an axial direction of the shaft and which are provided side by side or continuously along a rotational direction of the first ratchet wheel about the shaft.

The second ratchet wheel is mounted so as not to be allowed to rotate relative to the shaft but to move along the axial direction of the shaft. A plurality of teeth are formed on a surface of the second ratchet wheel which faces the first ratchet wheel for mesh engagement with the plurality of teeth of the first ratchet wheel.

The compression spring biases the second ratchet wheel towards the first ratchet wheel.

PATENT LITERATURE

[Patent Literature 1] JP-A-2001-141402

Incidentally, in measuring a dimension of an object to be measured by making use of a micrometer, depending upon types of objects to be measured, there are some objects to be measured which are deformed by a measuring force (a measuring force that is controlled by a constant-force device) applied thereto from a spindle of the micrometer.

Because of this, it is desirable that the constant-force device is configured so as to change measuring forces.

Here, in the constant-force device described in Patent Literature 1, the measuring force conforms to the projection heights of the pluralities of teeth which are formed on the first and second ratchet wheels (the projection heights in the axial direction of the shaft).

Namely, with the constant-force device described in Patent Literature, the measuring force cannot be changed unless the first and second ratchet wheels are replaced with other ratchet wheels (unless the projection heights of the pluralities of teeth are changed to other projection heights).

Consequently, a technique has been demanded with which measuring forces can easily be changed without involving the replacement of parts.

SUMMARY

One or more exemplary embodiments of the present invention provide a constant-force device which can easily change measuring forces without involving the replacement of parts and a micrometer.

A constant-force device according to an exemplary embodiment comprises:

a shaft;

a first ratchet wheel mounted rotatably on the shaft, a first ratchet wheel having a plurality of first sawtoothed projections, each of which projects in a first direction along an axis of the shaft;

a second ratchet wheel mounted on the shaft so as not to rotate relative to the shaft but to move along the shaft, the second ratchet wheel having a plurality of second sawtoothed projections, each of which projects in a second direction opposite to the first direction;

at least one intermediate ratchet wheel mounted on the shaft so as not only to rotate relative to the shaft but also to move along the shaft between the first ratchet wheel and the second ratchet wheel, the intermediate ratchet wheel having a plurality of first intermediate sawtoothed projections and a plurality of second intermediate sawtoothed projections, the first intermediate sawtoothed projections meshing with the first sawtoothed projections of the first ratchet wheel, the second intermediate sawtoothed projections meshing with the second sawtoothed projections of the second ratchet wheel;

a biasing member configured to bias the second ratchet wheel towards the first ratchet wheel; and a lock mechanism configured to set at least one of pairs of ratchet wheels which lie adjacent to each other in a connected or unconnected state, wherein a height of each of the first sawtoothed projections is different from a height of each of the second sawtoothed projections.

Here, as long as the intermediate ratchet wheel is disposed between the first and second ratchet wheels, the number of intermediate ratchet wheels to be disposed—may be single or plural. For example, when a configuration is adopted in which only one intermediate ratchet wheel is provided, of a pair of intermediate sawtoothed projections, one intermediate sawtoothed projection (first intermediate sawtoothed projection) meshes with the first sawtoothed projection. Then, the other intermediate sawtoothed projection (second intermediate sawtoothed projection) meshes with the second sawtoothed projection.

Additionally, the connected state that is set by the lock mechanism means a state in which the adjacent ratchet wheels are connected together by the lock mechanism so that the ratchet wheels so connected can rotate together. In addition, the unconnected state that is sot by the lock mechanism means a state in which the adjacent ratchet wheels are not connected to each other by the lock mechanism so that the ratchet wheels can rotate independently of each other.

In the following description, as a matter of convenience, the constant-force device will be described as including only one intermediate ratchet wheel.

By adopting this configuration, when the constant-force device of the invention is installed in a micrometer and by making use of the lock mechanism, the first ratchet wheel and the intermediate ratchet that pair up are set in the connected state, while the intermediate ratchet wheel and the second ratchet wheel that pair up are set in the unconnected state, the constant-force device operates as follows.

When the first ratchet wheel rotates in response to the rotation of the operation sleeve, since the first ratchet wheel and the intermediate ratchet wheel that pair up are in the connected state, the intermediate ratchet wheel rotates in association with the rotation of the first ratchet wheel.

Additionally, when the intermediate ratchet wheel rotates, the second ratchet wheel (the shaft) also rotates as a result of the mesh engagement of the intermediate ratchet wheel with the second ratchet wheel, whereby the spindle is displaced in the axial direction.

Then, when the spindle comes into abutment with an object to be measured, applying a load that is equal to or larger than a predetermined magnitude to the spindle, the second ratchet wheel escapes in a direction in which the second ratchet wheel moves away from the intermediate ratchet wheel, whereby the rotational force of the intermediate ratchet wheel is not transmitted to the second ratchet wheel, resulting in the operation sleeve turning idly.

Namely, when the load that is equal to or larger than the predetermined magnitude is applied to the spindle, the rotational force is not transmitted between the pair of ratchet wheels which are in the unconnected state, whereby the operation sleeve turns idly.

In this case, the measuring force that is applied to the object to be measured is maintained at a first measuring force that is determined by the projecting height of the meshing sawtoothed projections (the second sawtoothed projection) of the ratchet wheels that pair up and which are in the unconnected state.

On the other hand, when the first ratchet wheel and the intermediate ratchet wheel that pair up are set in the unconnected state, while the intermediate ratchet wheel and the second ratchet wheel that pair up are set in the connected state by making use of the lock mechanism, the spindle is displaced in the axial direction as it is done in the previous case. Then, when the spindle comes into abutment with the object to be measured, applying a load that is equal to or larger than the predetermined magnitude to the spindle, the rotational force is not transmitted between the first ratchet wheel and the intermediate ratchet wheel that pair up and which are in the unconnected state, whereby the operation sleeve turns idly.

In this case, the measuring force that is applied to the object to be measured is maintained at a second measuring force which is determined by the projecting height (the first sawtoothed projection) of the meshing sawtoothed projections of the ratchet wheels that pair up and which are in the unconnected state.

Thus, as has been described above, by making use of the lock mechanism, the measuring force can easily be changed without replacing the parts of the constant-force device, thereby making it possible to attain the object of the invention.

In the constant-force device, the intermediate ratchet wheel may include a plurality of intermediate ratchet wheels, each of which has a plurality of first intermediate sawtoothed projections and a plurality of second intermediate sawthoothed projections, a height of each of the first intermediate sawtoothed projections different from a height of each of the second intermediate sawtoothed projections, and the first intermediate sawtoothed projections of the intermediate ratchet wheel which is adjacent to the first ratchet wheel may mesh with the first sawtoothed projections of the first ratchet wheel, and the second intermediate sawtoothed projections of the intermediate ratchet wheel that is adjacent to the second ratchet wheel may mesh with the second sawtoothed projections of the second ratchet wheel.

In one embodiment, two or more intermediate ratchet wheels are disposed between the first and second ratchet wheels. Further, the pair of intermediate sawtoothed projections of each of the intermediate ratchet wheels are formed so that a height of each of the intermediate sawtoothed projections (first intermediate sawtoothed projections) on one side of the intermediate ratchet wheel is different from that of each of the intermediate sawtoothed projections (second intermediate sawtoothed projections) on the other side of the intermediate ratchet wheel.

By adopting this configuration, for example, when two intermediate ratchet wheels are disposed between the first and second ratchet wheels (hereinafter, the two intermediate ratchet wheels will be referred to sequentially as a first intermediate ratchet wheel and a second intermediate ratchet wheel in that order from the side of the first ratchet wheel), the number of pairs of ratchet wheels which can be set in an unconnected state will be three (that is, three pairs of the first ratchet wheel and the first intermediate ratchet wheel, the first intermediate ratchet wheel and the second intermediate ratchet wheel, and the second intermediate ratchet wheel and the second ratchet wheel). On the other hand, when one intermediate ratchet wheel is disposed between the first and second ratchet wheels, the number of pairs of ratchet wheels that can be set in the unconnected state is two.

Namely, since the measuring force that is applied to the object to be measured is determined by the projecting height of the meshing sawtoothed projections of the ratchet wheels that pair up and which are set in the unconnected state, every time the number of intermediate ratchet wheels is increased by one, the number of pairs of ratchet wheels that can be set in the unconnected state can be increased by one, and hence, the number of measuring forces that can be changed can be increased by one.

Consequently, by providing the plurality of intermediate ratchet wheels, the measuring force can be changed to three stages or more.

In the following description, as a matter of convenience, the constant-force device will be described as including only one intermediate ratchet wheel.

In the invention, for example, when the projecting height of the first sawtoothed projection is smaller than the projecting height of the second sawtoothed projection, the lock mechanism sets the first ratchet wheel and the intermediate ratchet wheel that pair up in the connected or unconnected state, the projecting height of the meshing sawtoothed projections (the first sawtoothed projection) of the first ratchet wheel and the intermediate ratchet wheel that pair up being smaller than the projecting height of the meshing sawtoothed projections (the second sawtoothed projection) of the intermediate ratchet wheel and the second ratchet wheel that pair up.

Incidentally, when the projecting height of the first sawtoothed projection is smaller than the projecting height of the second sawtoothed projection, a frictional force generated when the intermediate ratchet wheel and the second ratchet wheel mesh with each other becomes larger than a frictional force generated when the first ratchet wheel and the intermediate ratchet wheel mesh with each other.

Namely, when the first ratchet wheel and the intermediate ratchet wheel that pair up are set in the unconnected state by the lock mechanism, as has been described above, the frictional force generated between the intermediate ratchet wheel and the second ratchet wheel becomes larger than the frictional force generated between the first ratchet wheel and the intermediate ratchet wheel. Therefore, when the operation sleeve is rotated further when a load that is equal to or larger than the predetermined magnitude is applied to the spindle, the mesh engagement of the first ratchet wheel with the intermediate ratchet wheel tends to be released more easily than the mesh engagement of the intermediate ratchet wheel with the second ratchet wheel is done.

Because of this, without adopting the configuration in which the intermediate ratchet wheel and the second ratchet wheel that pair up are set in the connected state by the lock mechanism, a pseudo connected state can be set between the intermediate ratchet wheel and the second ratchet wheel that pair up by the frictional force generated therebetween, whereby the measuring force that is applied to the object to be measured can well be changed to the second measuring force in addition to the first measuring force.

Consequently, the lock mechanism can be made up of a required least number of constituent parts, thereby making it possible to simplify the construction of the constant-force device.

In this invention, since the constant-force device includes the adjusting member, the biasing force applied by the biasing member can be adjusted by changing the screwed state of the adjusting member on the shaft, thereby making it possible to adjust the measuring force that is applied to the object to be measured from the shaft by way of the spindle.

Consequently, the measuring force can be adjusted finely by making use of the adjusting member, while the measuring force can be adjusted in multiple stages by making use of the lock mechanism.

A micrometer according to the invention is a micrometer for measuring a dimension of an object to be measured based on a displacement of a spindle and includes the constant-force device that has been described above.

In this embodiment, since the micrometer includes the constant-force device, the micrometer can obtain the same function and advantage as those provided by the constant-force device.

BRIEF DESCRIPTION OF THE DRAWINGS

FIG. 6 is a front view showing a configuration of a constant-force device having multiple intermediate ratchet wheels according to one embodiment of the present invention.

DETAILED DESCRIPTION

First Embodiment

Hereinafter, a first embodiment of the invention will be described by reference to the drawings.

[Configuration of Micrometer]

Figure 1:
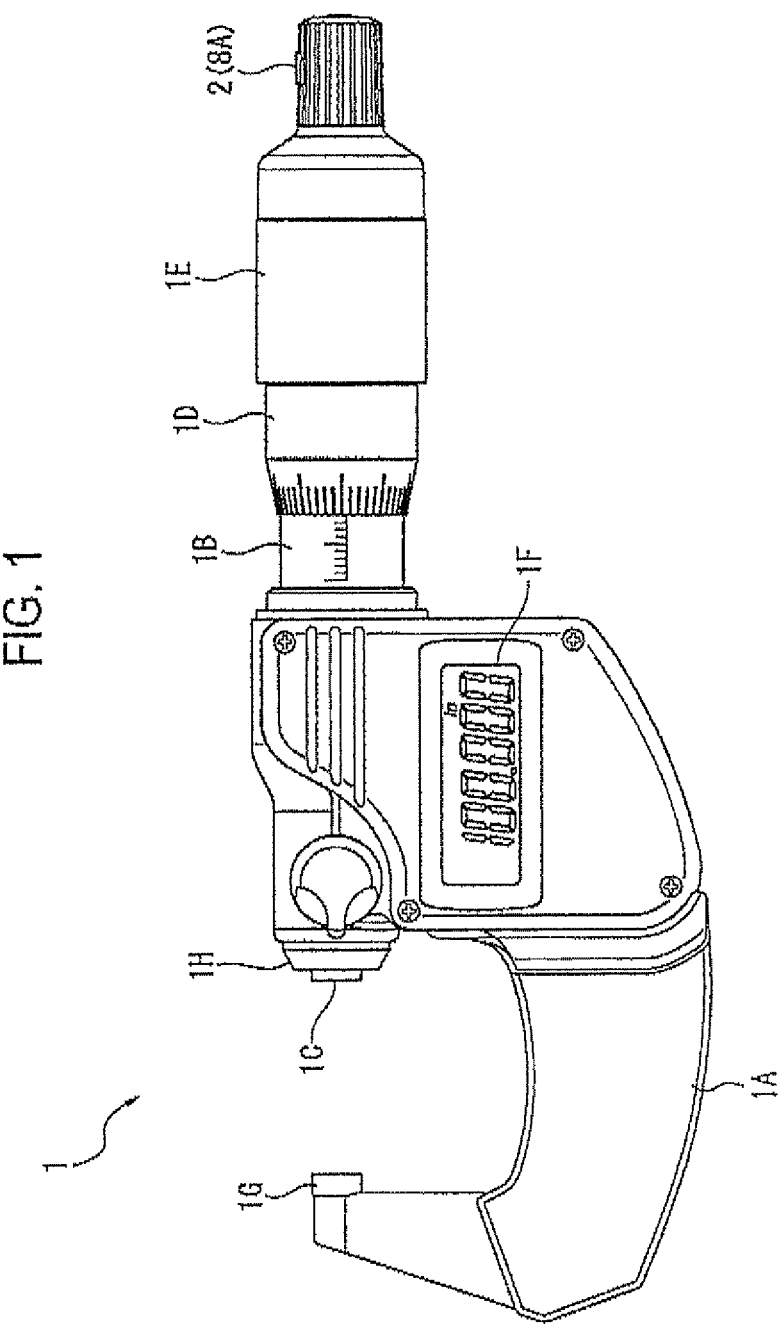
FIG. 1 is a front view showing a configuration of a micrometer according to a first embodiment.

FIG. 1 is a front view showing the configuration of a micrometer 1 according to a first embodiment.

Figure 2:
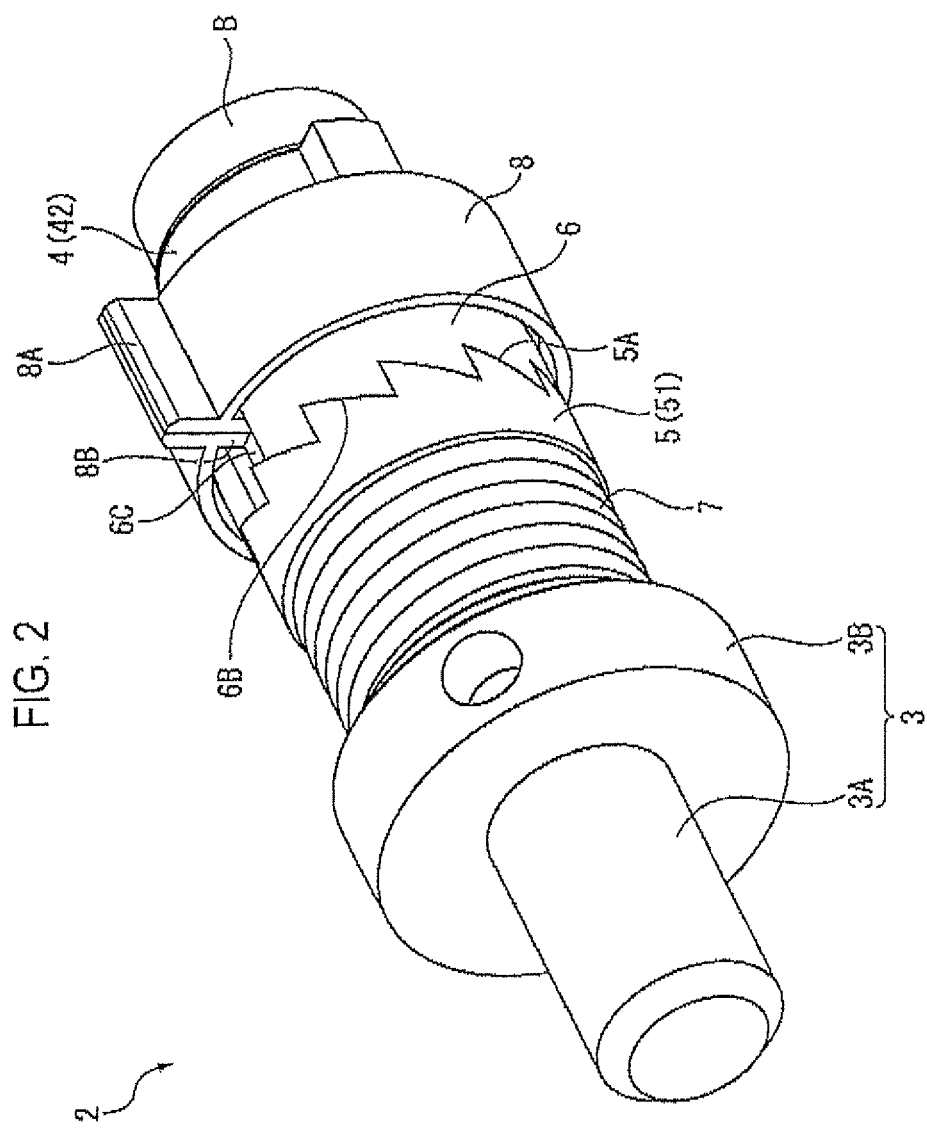
FIG. 2 is a perspective view showing a configuration of a constant-force device 2.
Figure 3:
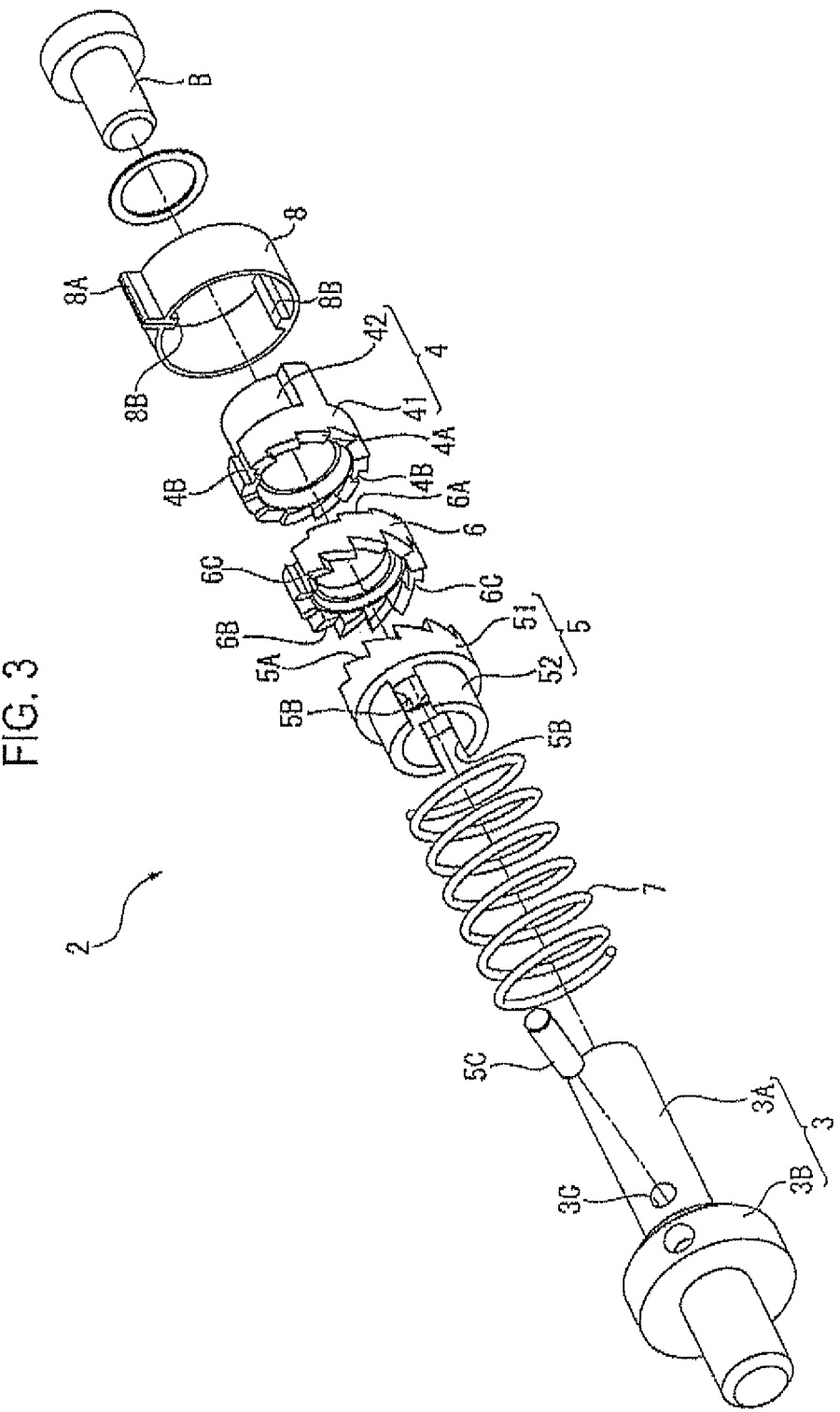
FIG. 3 is an exploded perspective view showing the configuration of the constant-force device.

As shown in FIG. 1, the micrometer 1 includes a main body 1A, a fixed sleeve 1B, a spindle 1C, a thimble 1D, an operation sleeve 1E, a digital display 1F and a constant-force device 2 (refer to FIGS. 2, 3).

It should be noted that since the constituent components 1A to 1F are similar to those used in a general micrometer, the configurations of the constituent components 1A to 1F are known, and therefore, the constituent components 1A to 1F will be described briefly.

As shown in FIG. 1, the main body 1A has a substantially U-shape.

Additionally, an anvil 1G is fixed to one end of the main body 1A. In addition, a bearing tube 1H through which the spindle 1C can be inserted is provided at the other end of the main body 1A.

As shown in FIG. 1, the fixed sleeve 1B is fixed to the other end of the main body 1A.

Additionally, the spindle 1C is screwed into the fixed sleeve 1B, and the fixed sleeve 1B supports the spindle 1C together with the bearing tube 1H.

The spindle 1C is inserted through the bearing tube 1H and is screwed into the fixed sleeve 1B. Thus, the spindle 1C is caused to move towards or away from the anvil 1G when the screwed state of the spindle 1C in the fixed sleeve 1B is changed (the spindle 1C is rotated).

The thimble 1D is rotatably fitted on an outer circumference of the fixed sleeve 1B and is integrally connected to a proximal end portion (an end portion opposite to a distal end portion (a left end portion in FIG. 1) which faces the anvil 1G) of the spindle 1C at an outer end (a right end in FIG. 1) thereof.

As shown in FIG. 1, the operation sleeve 1E is fitted so as to extend from an outer circumference of the thimble 1D to the proximal end portion of the spindle 1C and is allowed to rotate relative to the thimble 1D.

As shown in FIG. 1, the digital display 1F is fixed to a front side of the main body 1A at the other end thereof and displays a displacement (a measured value) of the spindle 1C that is detected by an encoder (not shown) under the control by a control unit (not shown).

[Configuration of Constant-Force Device]

FIGS. 2 and 3 are drawings showing the configuration of the constant-force device 2. Specifically, FIG. 2 is a perspective view showing the configuration of the constant-force device 2, and FIG. 3 is an exploded perspective view showing the configuration of the constant-force device 2.

The constant-force device 2 is disposed in an interior of the operation sleeve 1E (at the proximal end portion of the spindle 1C) so as not only to transmit the rotation of the operation sleeve 1E to the spindle 1C but also to cause the operation sleeve 1E to turn idly relative to the spindle 1C when a load of a predetermined magnitude or larger is applied to the spindle 1C. Namely, the constant-force device 2 is a unit for holding constant the measuring force that is applied from the spindle 1C to an object to be measured.

As shown in FIG. 2 or 3, this constant-force device 2 includes a shaft 3, a first ratchet wheel 4, a second ratchet wheel 5, an intermediate ratchet wheel 6, a biasing member 7 and a lock mechanism 8.

As shown in FIG. 2 or 3, the shaft 3 includes a cylindrical pillar portion 3A having a cylindrical pillar shape which extends along an axial direction of the spindle 1C and a collar 3B that is provided on the cylindrical pillar portion 3A in a position which lies further towards one end (a left end in FIGS. 2 and 3) of the cylindrical pillar portion 3A than an axially central position thereof and which has an outside diameter that is larger than that of the cylindrical pillar portion 3A.

As shown in FIG. 3, a through hole 3C is formed in the cylindrical pillar portion 3A in a position which lies further towards the other end of the cylindrical pillar portion 3A (a right end in FIG. 3) than the collar 3B, and this through hole 3C extends in a direction which is at right angles to the axial direction of the cylindrical pillar portion 3A.

Additionally, the shaft 3 is fixed to the proximal end portion of the spindle 1C at the one end of the cylindrical pillar portion 3A.

As shown in FIG. 3, the first ratchet wheel 4 has a cylindrical pipe shape which enables the cylindrical pillar portion 3A to be inserted therethrough and is allowed to rotate relative to the shaft 3 when the shaft 3 is inserted therethrough.

This first ratchet wheel 4 includes a first ratchet wheel main body 41 and a first connecting portion 42 that is positioned further towards the other end of the shaft 3 than the first ratchet wheel main body 41 and which has a smaller outside diameter than that of the first ratchet wheel main body 41, the first ratchet wheel main body 41 and the first connecting portion 42 being integrated with each other.

First sawtoothed projections 4A are formed at an end face of the first ratchet wheel main body 41 on a side of the one end of the shaft 3, and the first sawtoothed projections 4A project in the axial direction of the shaft 3 and are provided side by side or continuously along a rotational direction of the first ratchet wheel 4 about the shaft 3.

Additionally, a pair of first engagement grooves 4B are formed in an outer circumferential surface of the first ratchet wheel main body 41. The first engagement grooves 4B extend along the axial direction of the shaft 3 at locations diametrically opposite to each other across the shaft 3.

It is noted that the dislocation of the first ratchet wheel 4 from the shaft 3 is prevented by a bolt B (FIGS. 2, 3) which is mounted at the other end of the shaft 3.

As shown in FIG. 3, the second ratchet wheel 5 has a cylindrical pipe shape which enables the cylindrical pillar portion 3A to be inserted therethrough.

This second ratchet wheel 5 includes a second ratchet wheel main body 51 having an outside diameter that is substantially the same as that of the first ratchet wheel main body 41 and a second connecting portion 52 that is positioned further towards the one end of the shaft 3 than the second ratchet wheel main body 51 and which has a smaller outside diameter than that of the second ratchet wheel main body 51, the second ratchet wheel main body 51 and the second connecting portion 52 being integrated with each other.

As shown in FIG. 2 or 3, second sawtoothed projections 5A are formed at an end face of the second ratchet wheel main body 51 on a side of the other end of the shaft 3 (a surface of the second ratchet wheel main body 51 on a side of the first sawtoothed projections 4A), and the second sawtoothed projections 5A project in the axial direction of the shaft 3 and are provided side by side or continuously along a rotational direction of the second ratchet wheel 5 about the shaft 3.

Additionally, as shown in FIG. 3, the first sawtoothed projections 4A and the second sawtoothed projections 5A are formed at the same pitches (or are formed at the same intervals in the rotational direction of the first and second ratchet wheels 4, 5 about the shaft 3). However, the first sawtoothed projections 4A and the second sawtoothed projections 5A are formed so that their projecting distances or heights (distances or heights over which the respective projections project in the axial direction of the shaft 3) differ from each other.

More specifically, as shown in FIG. 3, the first sawtoothed projections 4A are formed sot that their projecting height is smaller than the projecting height of the second sawtoothed projections 5A.

Additionally, as shown in FIG. 3, a pair of cutout portions 5B are formed in the second connecting portion 52. These cutout portions 5B are cut from an end portion of the second connecting portion 52 on a side of the one end of the shaft 3 along the axial direction of the shaft 3 to a position which connects to the second ratchet wheel main body 51, at locations diametrically opposite to each other across the shaft 3.

Additionally, when an engagement pin 5C (FIG. 3) is inserted through the through hole 3C to enter the pair of cutout portions 5B, the second ratchet wheel 5 through which the shaft 3 is inserted is not allowed to rotate relative to the shaft 3 but is allowed to move along the axial direction of the shaft 3.

As shown in FIG. 3, the intermediate ratchet wheel 6 is formed into a cylindrical pipe shape having substantially the same outside diameter as those of the first and second ratchet wheel main bodies 41, 51, and when the shaft 3 is inserted therethrough, the intermediate ratchet wheel 6 is allowed to rotate relative to the shaft 3.

Additionally, as shown in FIG. 2 or 3, the intermediate ratchet wheel 6 is interposed between the first and second ratchet wheels 4, 5.

First intermediate sawtoothed projections 6A are formed at an end face of the intermediate ratchet wheel 6 on the side of the other end of the shaft 3 (an end face which faces the first ratchet wheel 4). As shown in FIG. 3, these first intermediate sawtoothed projections 6A project in the axial direction of the shaft 3 and are provided side by side or continuously along the rotational direction of the intermediate ratchet wheel 6 about the shaft 3.

In addition, second intermediate sawtoothed projections 6B are formed at an end face of the intermediate ratchet wheel 6 on the side of the one end of the shaft 3 (an end face which faces the second ratchet wheel 5). As shown in FIG. 2 or 3, these second intermediate sawtoothed projections 6B project in the axial direction of the shaft 3 and are provided side by side or continuously along the rotational direction of the intermediate ratchet wheel 6 about the shaft 3.

The first intermediate sawtoothed projections 6A are formed at the same pitches as those at which the first sawtoothed projections 4A are formed and project the same height as that over which the first sawtoothed projections 4A project. Thus, the first intermediate sawtoothed projections 6A mesh with the first sawtoothed projections 4A. Additionally, the second intermediate sawtoothed projections 6B are formed at the same pitches as those at which the second sawtoothed projections 5A are formed and project the same height as that over which the second sawtoothed projections 5A project. Thus, the second intermediate sawtoothed projections 6B mesh with the second sawtoothed projections 5A.

Namely, the first intermediate sawtoothed projections 6A and the second intermediate sawtoothed projections 6B are formed at the same pitches and project the different heights.

Then, the intermediate ratchet wheel 6 transmits the rotation of the first ratchet wheel 4 to the second ratchet wheel 5.

Additionally, as shown in FIG. 3, as with the pair of first engagement grooves 4B in the first ratchet wheel main body 41, a pair of second engagement grooves 6C are formed in an outer circumferential surface of the intermediate ratchet wheel 6 so as to extend along the axial direction of the shaft 3 at locations diametrically opposite to each other across the shaft 3.

As shown in FIG. 2 or 3, the biasing member 7 is made up of a coil spring through which the cylindrical pillar portion 3A can be inserted.

Then, the biasing member 7 is interposed between the collar 3B and the second ratchet wheel 5 so as to bias the second ratchet wheel 5 towards the first ratchet wheel 4.

As shown in FIG. 2 or 3, the lock mechanism 8 has a cylindrical pipe shape which enables the lock mechanism 8 to be fitted on an outer circumference of the first ratchet wheel main body 41 and is allowed to move thereover along the axial direction of the shaft 3.

An operation lug 8A is formed on an outer circumferential surface of the lock mechanism 8, and this operation lug 8A projects radially outwards and extends along the axial direction of the shaft 3.

Here, a slit (not shown) is formed in the operation sleeve 1E. This slit extends along the axial direction of the shaft 3, and the operation lug 8A is allowed to be inserted through the slit so formed.

A length of the slit (a length along the axial direction of the shaft 3) is set so as to be longer than a length of the operation lug 8A (a length along the axial direction of the shaft 3) in consideration of a traveling distance of the lock mechanism 8.

Then, when the operation lug 8A (FIG. 1) which is exposed to the outside of the operation sleeve 1E through the slit is operated, the lock mechanism 8 moves along the axial direction of the shaft 3.

Additionally, as shown in FIG. 2 or 3, a pair of engagement portions 8B are formed on an inner circumferential surface of the lock mechanism 8 at locations diametrically opposite to each other across the shaft 3. These engagement portions 8B project towards a diametrical center of the lock mechanism 8 and extend along the axial direction of the shaft 3.

Then, when the lock mechanism 8 is fitted on the first ratchet wheel 4 or the intermediate ratchet wheel 6, the pair of engagement portions 8B are brought into engagement with the first engagement grooves 4B or the second engagement grooves 6C.

Figure 4A:
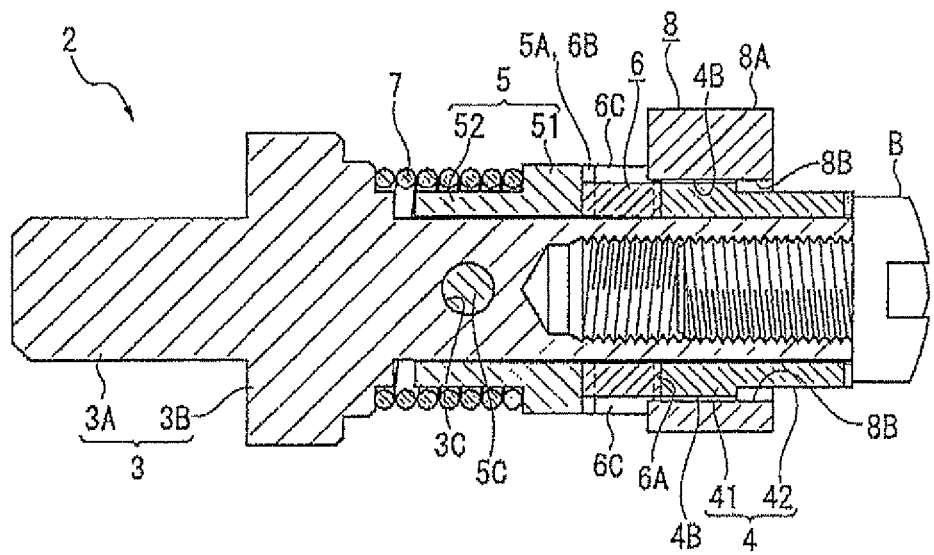
FIGS. 4A and 4B are diagrams illustrating a function of a lock mechanism.
Figure 4B:
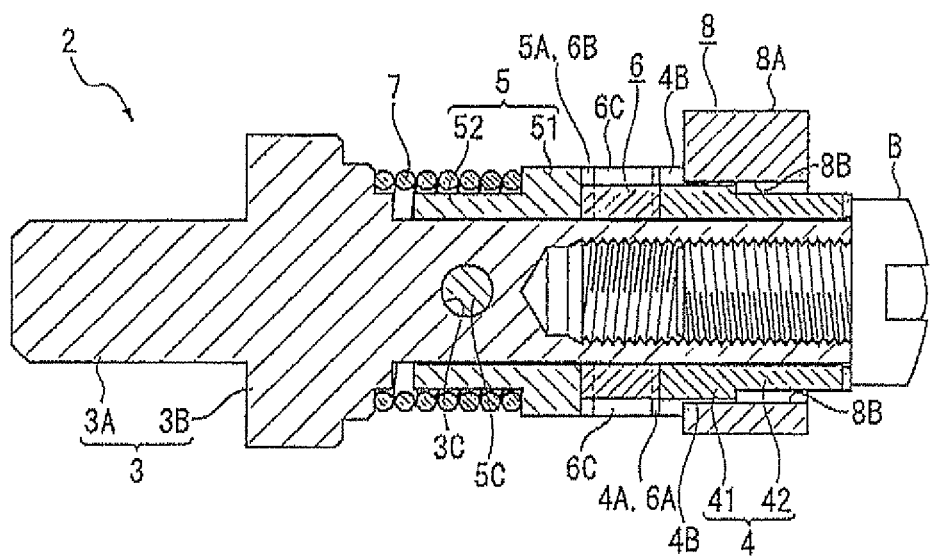

FIGS. 4A and 4B show diagrams illustrating the function of the lock mechanism 8. Specifically, FIG. 4A shows a state in which the lock mechanism 8 is moved to the one end of the shaft 3, and FIG. 4B shows a state in which the lock mechanism 8 is moved to the other end of the shaft 3.

When the lock mechanism 8 is moved to the one end of the shaft 3, as shown in FIG. 4A, the engagement portions 8B are brought into engagement with both the first and second engagement grooves 4B, 6C. Namely, the first ratchet wheel 4 and the intermediate ratchet wheel 6 are connected together by the lock mechanism 8 so as to rotate together.

In the state shown in FIG. 4A, when the operation sleeve 1E is rotated, an inner surface of the slit that is formed in the operation sleeve 1E pushes on the operation lug 8A, whereby the lock mechanism 8 moves in association with the rotation of the operation sleeve 1E.

Additionally, since the engagement portions 8B are in engagement both with the first and second engagement grooves 4B, 6C, the first ratchet wheel 4 and the intermediate ratchet wheel 6 both move in association with the rotation of the lock mechanism 8.

Then, the second ratchet wheel 5 (the shaft 3) is also rotated in association with the rotation of the intermediate ratchet wheel 6 as a result of the mesh engagement of the second intermediate sawtoothed projections 6B with the second sawtoothed projections 5A. Namely, the rotation of the operation sleeve 1E is transmitted to the spindle 1C by way of the constant-force device 2, and the spindle 1C moves towards or away from the anvil 1G while being rotated.

Here, when the spindle 1C moves in a direction in which the spindle 1C approaches the anvil 1G and eventually comes into abutment with an object to be measured, a load that is equal to or larger than a predetermined magnitude is applied to the spindle 1C. As this occurs, the operation sleeve 1E is caused to turn idly by the constant-force device 2.

Specifically, in such a state that a load that is equal to or larger than the predetermined magnitude is being applied to the spindle 1C, the spindle 1C (the second ratchet wheel 5) is having difficulty in rotating.

Because of this, when the operation sleeve 1E is attempted to be rotated further, the second ratchet wheel 5 escapes in a direction in which the second ratchet wheel 5 moves away from the intermediate ratchet wheel 6 against the biasing force of the biasing member 7, whereby the rotational force of the intermediate ratchet wheel 6 is not transmitted to the second ratchet wheel 5, resulting in the operation sleeve 1E turning idly.

Namely, when the load that is equal to or larger than the predetermined magnitude is applied to the spindle 1C, no rotational force is transmitted between the ratchet wheels (the intermediate ratchet wheel 6 and the second ratchet wheel 5) that pair up and which are kept unconnected by the lock mechanism 8, whereby the operation sleeve 1E turns idly.

Then, in the state shown in FIG. 4A, a measuring force that is applied to an object to be measured is maintained at a first measuring force which is determined by the projecting height of the meshing sawtoothed projections (the second sawtoothed projections 5A) of the ratchet wheels (the intermediate ratchet wheels 6 and the second ratchet wheels 5) that pair up and which are not set in the connected state.

On the other hand, when the lock mechanism 8 moves to the other end of the shaft 3, as shown in FIG. 4B, the engagement portions 8B are not brought into engagement with the second engagement grooves 6C but are brought into engagement with only the first engagement grooves 4B. Namely, the first ratchet wheel 4 and the intermediate ratchet wheel 6 are set in the unconnected state in which the first ratchet wheel 4 and intermediate ratchet wheel 6 are allowed to rotate independently of each other.

In the state shown in FIG. 4B, when the operation sleeve 1E (the lock mechanism 8) is rotated, since the engagement portions 8B are in engagement with only the first engagement grooves 4B, only the first ratchet wheel 4 rotates in association with the rotation of the lock mechanism 8.

Then, as a result of not only the mesh engagement of the first sawtoothed projections 4A with the first intermediate sawtoothed projections 6A but also the mesh engagement of the second intermediate sawtoothed projections 6B with the second sawtoothed projections 5A, the intermediate ratchet wheel 6 and the second ratchet wheel 5 also rotate in association with the rotation of the first ratchet wheel 4. Thus, in a similar way to that described above, the spindle 1C moves towards or away from the anvil 1G while being rotated.

Here, when the spindle 1C moves in the direction in which the spindle 1C approaches the anvil 1G to thereby be brought into abutment with an object to be measured, applying a load that is equal to or larger than the predetermined magnitude to the spindle 1C, in a similar way to that described above, the operation sleeve 1E is caused to turn idly by the constant-force device 2.

Specifically, in the state shown in FIG. 4B, the first ratchet wheel 4, the intermediate ratchet wheel 6 and the second ratchet wheel 5 are allowed to rotate independently of each other. Additionally, as has been described above, the second sawtoothed projections 5A (the second intermediate sawtoothed projections 6B) are formed at the same pitches as those at which the first sawtoothed projections 4A (the first intermediate sawtoothed projections 6A) are formed but project further or higher than the first sawtoothed projections 4A (the first intermediate sawtoothed projections 6A). Namely, a frictional force that is generated when the second intermediate sawtoothed projections 6B mesh with the second sawtoothed projections 5A is larger than a frictional force that is generated when the first intermediate sawtoothed projections 6A mesh with the first sawtoothed projections 4A.

Because of this, in the event that the operation sleeve 1E is rotated further when the load that is equal to or larger than the predetermined magnitude is applied to the spindle 1C, the mesh engagement between the first ratchet wheel 4 and the intermediate ratchet wheel 6 that pair up becomes easier to be released than the mesh engagement between the intermediate ratchet wheel 6 and the second ratchet wheel 5 that pair up is done due to the relationship in magnitude of frictional force generated by the pairs of meshing sawtoothed projections. Namely, a pseudo connection is set between the intermediate ratchet wheel 6 and the second ratchet wheel 5 by the frictional force generated therebetween.

Consequently, in the event that the operation sleeve 1E is rotated further when the load that is equal to or larger than the predetermined magnitude is applied to the spindle 1C, the intermediate ratchet wheel 6 escapes in a direction in which the intermediate ratchet wheel 6 moves away from the first ratchet wheel 4 against the biasing force of the biasing member 7, whereby the rotational force of the first ratchet wheel 4 is not transmitted to the intermediate ratchet wheel 6, the operation sleeve 1E being thereby caused to turn idly.

Then, in the state shown in FIG. 4B, the measuring force that is applied to the object to be measured is maintained at a second measuring force that is determined by the projecting height of the meshing sawtoothed projections (the first sawtoothed projections 4A) of the ratchet wheels (the first ratchet wheel 4 and the second ratchet wheel 6) that pair up and which are set in the unconnected state by the lock mechanism 8.

It is noted that since the projecting height of the first sawtoothed projections 4A is smaller than the projecting height of the second sawtoothed projections 5A as has been described above, the first measuring force is larger than the second measuring force.

According to the first embodiment that has been described heretofore, the following advantage will be provided.

In the first embodiment, the constant-force device 2 includes the intermediate ratchet wheel 6 that is interposed between the first and second ratchet wheels 4, 5 and the lock mechanism 8 which sets the first ratchet wheel 4 and the intermediate ratchet wheel 6 that pair up in the connected state or the unconnected state. Additionally, the first and second sawtoothed projections 4A, 5A which are formed on the first and second ratchet wheels 4, 5, respectively, are made to have the different projecting heights.

In this configuration, by making use of the lock mechanism 8, the measuring force can easily be changed to the first measuring force or the second measuring force without replacing the constituent parts of the constant-force device 2.

In addition, the lock mechanism 8 sets the first ratchet wheel 4 and the intermediate ratchet wheel 6 which have the sawtoothed projections of the smaller projecting height in the connected or unconnected state.

Namely, the intermediate ratchet wheel 6 and the second ratchet wheel 5 can be set in connection with each other in a pseudo fashion by making use of the frictional force generated between the meshing sawtoothed projections without adopting a configuration in which the intermediate ratchet wheel 6 and the second ratchet wheel 5 are set in the connected state by the lock mechanism 8, and the measuring force that is applied to the object to be measured can well be changed to the second measuring force in addition to the first measuring force.

Consequently, the lock mechanism 8 can be made up of a required least number of constituent parts, thereby making it possible to simplify the construction of the constant-force device 2.

Second Embodiment

Next, a second embodiment of the invention will be described.

Figure 5:
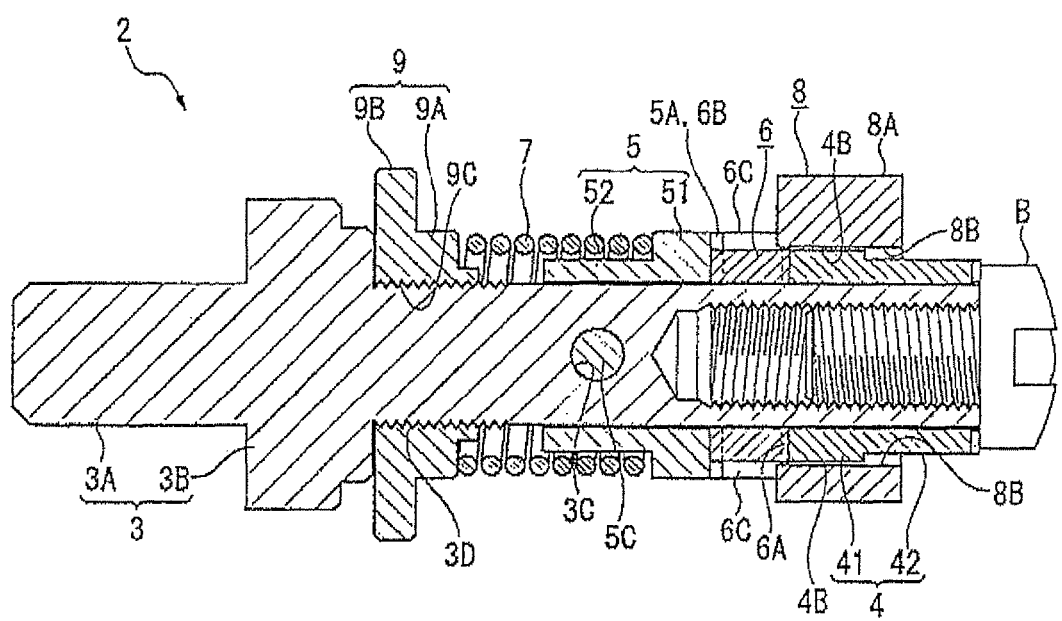
FIG. 5 is a diagram showing a configuration of a constant-force device according to a second embodiment.

FIG. 5 is a diagram showing the configuration of a constant-force device 2 according to a second embodiment.

It is noted that hereinafter, like reference numerals will be given to configurations like to those of the first embodiment and that the detailed description thereof will be omitted.

In this embodiment, as shown in FIG. 5, only the configuration of a constant-force device 2 differs from that of the first embodiment, and all the other configurations remain the same as those of the first embodiment.

Specifically speaking, as shown in FIG. 5, in this embodiment, the constant-force device 2 includes an adjusting member 9 in addition to constituent members 3 to 8 which are like to those described in the first embodiment.

As shown in FIG. 5, the adjusting member 9 has a cylindrical pipe shape into which a small diameter portion 9A and a large diameter portion 9B are integrated. This adjusting member 9 is interposed between a collar 3B and a biasing member 7 (is disposed in a position that is opposed to a second ratchet wheel 5 with the biasing member 7 sandwiched therebetween).

As shown in FIG. 5, a screw thread portion 9C is formed on an inner circumferential surface of the adjusting member 9, and this screw thread portion 9C is designed to screw on a screw thread portion 3D which is formed on an outer circumferential surface of a shaft 3 (a cylindrical pillar portion 3A) in a position which lies further towards the other end of the shaft 3 than the collar 3B.

Here, a slit (riot shown) is formed in art operation sleeve 1E so as to extend along a rotational direction thereof about the shaft 3, and the large diameter portion 9B is inserted therethrough.

It is noted that a width of the slit (a width defined along an axial direction of the shaft 3) is set to be larger than a thickness dimension of the large diameter portion 9B in consideration of a traveling distance of the adjusting member 9.

Additionally, when the large diameter portion 9B which is exposed to the outside of the operation sleeve 1E through the slit is operated (when the screwed state of the adjusting member 9 on the shaft 3 is changed), the adjusting member 9 moves along the axial direction of the shaft 3 so as to cause the biasing member 7 to be contracted or stretched between the second ratchet wheel 5 and itself to thereby adjust the biasing force applied by the biasing member 7.

According to the second embodiment that has been described heretofore, in addition to a similar advantage to that provided by the first embodiment, the following advantage is provided.

In this embodiment, since the constant-force device 2 includes the adjusting member 9, a measuring force that is applied to an object to be measured from the shaft 3 by way of a spindle 1C can be adjusted by adjusting the biasing force applied by the biasing member 7 by changing the screwed state of the adjusting member 9 on the shaft 3.

Consequently, the measuring force can be adjusted finely by making use of the adjusting member 9 while enabling the measuring force to be changed largely in two stages by making use of the lock mechanism 8.

It is noted that the invention is not limited to the embodiments that have been described heretofore, and modifications and/or improvements that can be made within the scope where the object of the invention can be attained are to be incorporated in the invention.

In the respective embodiments, while only the single intermediate ratchet wheel 6 is disposed between the first and second ratchet wheels 4, 5, the invention is not limited thereto, and hence, a plurality of intermediate ratchet wheels 6 may be disposed therebetween. It is noted that even when the plurality of intermediate ratchet wheels 6 are so disposed, the configuration should be adopted in which the respective projecting heights of the first and second intermediate sawtoothed projections 6A, 6B differ from each other.

For example, when two intermediate ratchet wheels are disposed between first and second ratchet wheels 4, 5 (hereinafter, the two intermediate ratchet wheels will be referred to sequentially as a first intermediate ratchet wheel and a second intermediate ratchet wheel in that order from the side of the first ratchet wheel 4), the number of pairs of ratchet wheels which can be set in the unconnected state will be three (that is, three pairs of the first ratchet wheel 4 and the first intermediate ratchet wheel, the first intermediate ratchet wheel and the second intermediate ratchet wheel, and the second intermediate ratchet wheel and the second ratchet wheel 5). On the other hand, as in each of the embodiments that have been described before, when the one intermediate ratchet wheel 6 is disposed between the first and second ratchet wheels 4, 5, the number of pairs of ratchet wheels that can be set in the unconnected state is two.

Namely, since the measuring force that is applied to the object to be measured is determined by the projecting height of the meshing sawtoothed projections of the ratchet wheels that pair up and which are set in the unconnected state, every time the number of intermediate ratchet wheels is increased by one, the number of pairs of ratchet wheels that can be set in the unconnected state can be increased by one, and hence, the number of measuring forces that can be changed can be increased by one.

Consequently, by providing the plurality of intermediate ratchet wheels, the measuring force can be changed to three stages or more.

In the respective embodiments, while the lock mechanism 8 sets only the first ratchet wheel 4 and the intermediate ratchet wheel 6 that pair up in the unconnected state, the invention is not limited thereto. Hence, a configuration may be adopted in which a mechanism similar to the lock mechanism 8 is added separately so as to set the intermediate ratchet wheel 6 and the second ratchet wheel 5 that pair up in a connected or unconnected state. This will also be true when providing the plurality of intermediate ratchet wheels 6.

Additionally, in the respective embodiments, the construction of the lock mechanism 8 is not limited to the construction that is described in each of the embodiments. Hence, any other constructions may be adopted as long as the constructions can set ratchet wheels that lie adjacent to each other in a connected or unconnected state.

In the respective embodiments, while the first and second sawtoothed projections 4A, 5A and the first and second intermediate sawtoothed projections 6A, 6B are all formed at the same intervals or pitches, the invention is not limited thereto. Hence, those projections may be formed at different pitches from each other.

In the respective embodiments, while the micrometer according to the invention is described as being configured as the micrometer 1 having the digital display, the invention is not limited thereto. Hence, the invention may also be applied to micrometers which include neither an encoder nor a digital display.

Additionally, in the respective embodiments, while the constant-force device 2 according to the invention is described as being installed in the micrometer 1, the invention is not limited thereto. Hence, the constant-force device 2 according to the invention may be installed, for example, in a measuring appliance having a spindle which is moved by the rotation of a micrometer head or a torque driver which controls a torque by employing a ratchet mechanism.

The invention can be used in a measuring appliance having a spindle which is moved by the rotation of a micrometer or a micrometer head.

What is claimed is:

1. A constant-force device comprising:
    a shaft;
    a first ratchet wheel mounted rotatably on the shaft, a first ratchet wheel having a plurality of first sawtoothed projections, each of which projects in a first direction along an axis of the shaft;
    a second ratchet wheel mounted on the shaft so as not to rotate relative to the shaft but to move along the shaft, the second ratchet wheel having a plurality of second sawtoothed projections, each of which projects in a second direction opposite to the first direction;
    at least one intermediate ratchet wheel mounted on the shaft so as not only to rotate relative to the shaft but also to move along the shaft between the first ratchet wheel and the second ratchet wheel, the intermediate ratchet wheel having a plurality of first intermediate sawtoothed projections and a plurality of second intermediate sawtoothed projections, the first intermediate sawtoothed projections meshing with the first sawtoothed projections of the first ratchet wheel, the second intermediate sawtoothed projections meshing with the second sawtoothed projections of the second ratchet wheel;
    a biasing member configured to bias the second ratchet wheel towards the first ratchet wheel; and
    a lock mechanism configured to set at least one of pairs of ratchet wheels which lie adjacent to each other in a connected or unconnected state, wherein
    a height of each of the first sawtoothed projections is different from a height of each of the second sawtoothed projections.

2. The constant-force device as set forth in claim 1, wherein
    the intermediate ratchet wheel includes a plurality of intermediate ratchet wheels, each of which has a plurality of first intermediate sawtoothed projections and a plurality of second intermediate sawthoothed projections, a height of each of the first intermediate sawtoothed projections different from a height of each of the second intermediate sawtoothed projections, and wherein
    the first intermediate sawtoothed projections of the intermediate ratchet wheel which is adjacent to the first ratchet wheel meshes with the first sawtoothed projections of the first ratchet wheel, and the second intermediate sawtoothed projections of the intermediate ratchet wheel that is adjacent to the second ratchet wheel meshes with the second sawtoothed projections of the second ratchet wheel.

3. The constant-force device as set forth in claim 1, wherein the lock mechanism is configured to set, of the pairs of ratchet wheels which are adjacent to each other, the pair of ratchet wheels of which the height of the meshing sawtoothed projections is smaller than the height of the meshing sawtoothed projections of the other pair of ratchet wheels in the connected or unconnected state.

4. The constant-force device as set forth in of claim 1, comprising:

an adjusting member which is opposed to the second ratchet wheel with the biasing member sandwiched therebetween and which is configured to screw on the shaft, wherein the adjusting member is configured to move in an axial direction of the shaft when a screwed state of the adjusting member with the shaft is changed so as to adjust a biasing force that is applied by the biasing member.

5. A micrometer for measuring a dimension of an object to be measured from a displacement of a spindle, comprising the constant-force device set forth in claim 1.

* * * * *